United States Patent [19]

Inasawa et al.

[11] 4,368,557
[45] Jan. 18, 1983

[54] PINTLE CATCH

[75] Inventors: Hideho Inasawa; Yoshinori Akiyama, both of Yokohama, Japan

[73] Assignee: Nippon Motor Company, Limited, Yokohama, Japan

[21] Appl. No.: 172,459

[22] Filed: Jul. 25, 1980

[30] Foreign Application Priority Data

Jul. 27, 1979 [JP] Japan .................................. 54-95733

[51] Int. Cl.³ .............................................. E05D 5/12
[52] U.S. Cl. .......................................... 16/263; 16/381
[58] Field of Search ................. 16/169, 175, 177, 263, 16/378, DIG. 37, 268, 270, 381; 292/155, 157

[56] References Cited

U.S. PATENT DOCUMENTS

| 2,323,674 | 7/1943 | Porkiss | 292/157 |
| 3,766,599 | 10/1973 | Ullman | 16/169 |

FOREIGN PATENT DOCUMENTS

| 2057329 | 6/1972 | Fed. Rep. of Germany . |
| 7611404 | 8/1976 | Fed. Rep. of Germany . |
| 343303 | 2/1931 | United Kingdom . |
| 511988 | 8/1939 | United Kingdom . |
| 539722 | 9/1941 | United Kingdom . |
| 623623 | 5/1949 | United Kingdom . |
| 645555 | 11/1950 | United Kingdom . |
| 656036 | 8/1951 | United Kingdom . |
| 688155 | 2/1953 | United Kingdom . |
| 782163 | 9/1957 | United Kingdom . |
| 793018 | 4/1958 | United Kingdom . |
| 1074115 | 6/1967 | United Kingdom . |
| 1125441 | 8/1968 | United Kingdom . |
| 1370086 | 10/1974 | United Kingdom . |
| 2017807A | 10/1979 | United Kingdom . |
| 1588975 | 5/1981 | United Kingdom . |

Primary Examiner—Werner H. Schroeder
Assistant Examiner—Andrew M. Falik
Attorney, Agent, or Firm—Schwartz, Jeffery, Schwaab, Mack, Blumenthal & Koch

[57] ABSTRACT

In a seatback pivotable joint, a pin, having an annular groove formed around the axis thereof, is secured to a stationary member of a vehicle body. A bracket having an opening therein is secured to the seatback. The pin passes through the opening of the bracket so that the annular groove of the pin is located behind the opening with respect to the stationary member. A catcher is provided for engaging the annular groove of the pin and for retaining the catcher in a predetermined position. A device for moving the catcher is supported by the bracket and moves the catcher from its inoperative position to the predetermined operative position thereby retaining the bracket relative to the pin.

5 Claims, 17 Drawing Figures

FIG. 3D
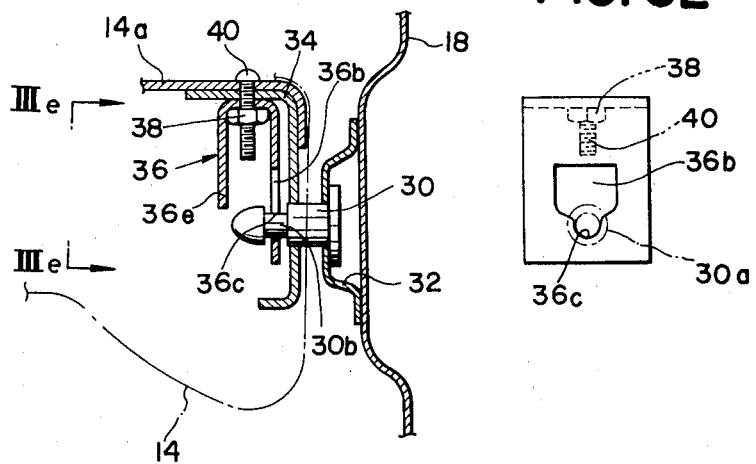
FIG. 3E
FIG. 4A
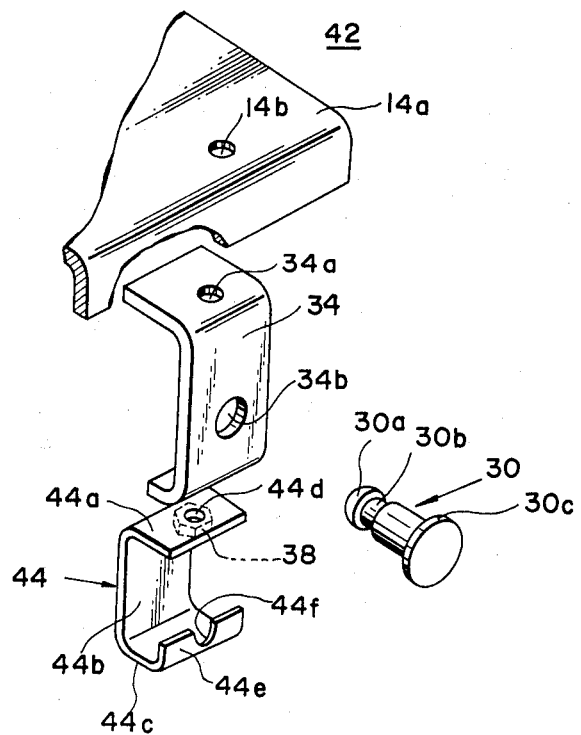

PINTLE CATCH

FIELD OF THE INVENTION

The present invention relates in general to a pivotal joint, and more particularly to a seatback pivotal joint which permits the seatback of a seat to be tiltable back and forth relative to the seat proper.

SUMMARY OF THE INVENTION

According to the present invention, there is provided a seatback pivotal joint for permitting the seatback of a seat to be tiltable back and forth relative to the seat proper. The seatback pivotal joint comprises a pin securely connected at its one end to a stationary member located beside the seat, the pin having an annular groove formed around the axis thereof, a bracket securely connected to the seatback, the bracket being formed with an opening through which the pin passes so that the annular groove of the pin is located behind the bracket with respect to the stationary member, a catcher movably arranged behind the bracket, the catcher having retaining means which is engageable with the annular groove of the pin to retain the same when the catcher takes a predetermined position, and moving means for moving the catcher from a position where the retaining means of the catcher is inoperative to the predetermined position.

It is an object of the present invention to provide a seatback pivotal joint which assures back and forth pivotal movement of the seatback relative to the seat proper.

It is another object of the present invention to provide a seatback pivotal joint which can be installed to a seat in a simple connecting manner.

It is still another object of the present invention to provide a seatback pivotal joint which exhibits good outward appearance when installed in the seat assembly.

Other objects and advantages of the present invention will become clear from the following description when taken in conjunction with the accompanying drawings.

BRIEF DESCRIPTION OF THE DRAWINGS

FIG. 3D is a view similar to FIG. 3B, but showing a completely assembled condition of the joint;

FIG. 3E is a view taken along the line IIIe—IIIe of FIG. 3D, but a part of the joint being omitted from illustration for clarification of the drawing;

FIG. 4A is an exploded view of a seatback pivotal joint of the second embodiment according to the present invention;

DESCRIPTION OF THE PRIOR ART

Prior to describing in detail the invention, an outlined explanation of conventionally used seatback pivotal joints will be made with reference to FIGS. 1A, 1B, 2A and 2B in order to clarify the invention.

Figure 1A:
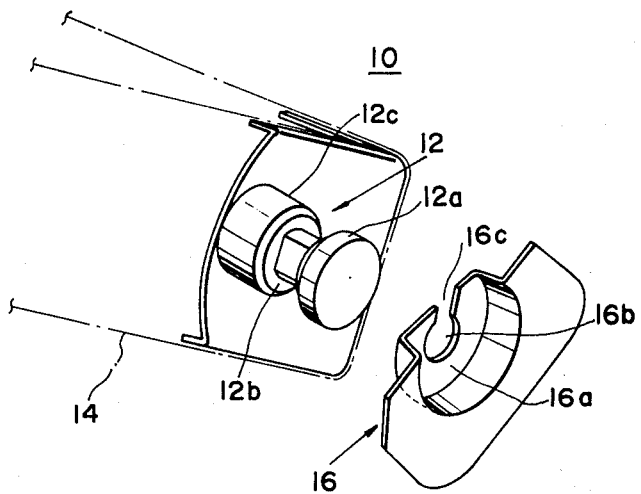
FIG. 1A is a perspective view of a conventional seatback pivotal joint in a disassembled condition.
Figure 1B:
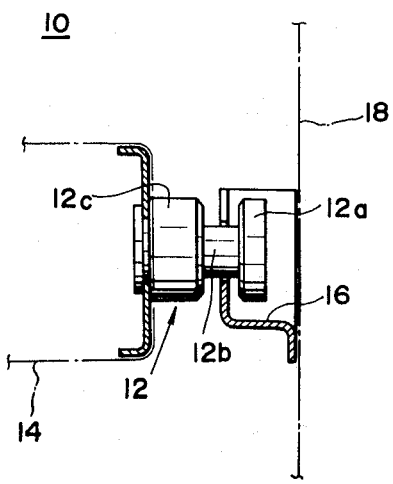
FIG. 1B is a section view of the joint of FIG. 1A in an assembled condition.

Referring to FIGS. 1A and 1B, there is shown a conventional seatback pivotal joint which is generally designated by numeral 10. The joint 10 generally comprises a headed pin 12 fixed at its lower enlarged section 12c to a lower side section of a seatback 14 of a seat assembly (not shown). The pin 12 is formed with a groove 12b at the position between the head 12a and the enlarged section 12c. The joint 10 further comprises a bracket 16 fixedly connected to a suitable portion of a vehicle body 18 (see FIG. 1B). As is best shown in FIG. 1A, the bracket 16 has a semicircular recess having a flat bottom wall 16a projecting inboard of the vehicle. The bottom wall 16a is formed with a cutout including a circular section 16b and an entrance section 16c. Upon assemblage, the groove 12b of the pin 12 is slidably engaged with the circular section 16b of the bracket 16 with the head 12a accommodated within the recess of the bracket 16, as is shown in FIG. 1B. With this assemblage, the back and forth tiltable movement of the seatback 14 is permitted relative to the seat proper.

Figure 2A:
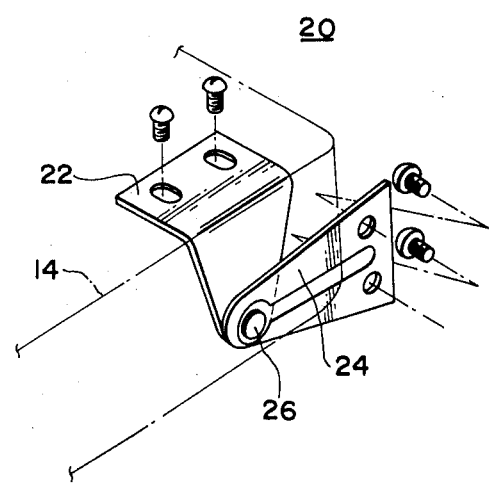
FIG. 2A is a perspective view of another conventional seatback pivotal joint in a disassembled condition.
Figure 2B:
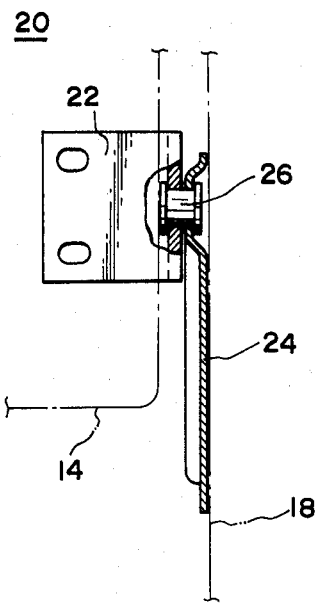
FIG. 2B is a section view of the joint of FIG. 2B in an assembled condition.

Referring to FIGS. 2A and 2B, there is shown another conventional seatback pivotal joint which is generally designated by numeral 20. The joint 20 generally comprises first and second attaching plates 22 and 24 which are respectively connected via bolts (no numerals) to the seatback 14 and a suitable portion of the vehicle body 18 (see FIG. 2B). A pivot pin 26 pivotally connects the leading ends of the plates 22 and 24 so that the seatback 14 is tiltable back and forth about the pin 26 relative to the seat proper (not shown).

The above-mentioned two conventional seatback pivotal joints 10 and 20, however, have the following drawbacks.

In the joint 10, the provision of the bracket 16 on the vehicle body 16 causes a presence of an opening through which the unfinished surface of the coated paint on the pin 12 is readily recognized by the viewer. Further, there is a high possibility of deforming the bracket 16 upon assemblage and disassemblage thereof because of the deformable construction of the same. Furthermore, there is a fear that upon tiltable movement of the seatback 14, the pin 12 tends to be disengaged from the cutout of the bracket 16 because of the construction of the bracket 16 having no restraining means.

In case of the joint 20, it requires troublesome steps when the joint 20 is mounted for connection between the seatback 14 and the vehicle body 18. In fact, the connection of the joint 20 to these parts or sections is made by, as a first step, conecting the joint 20 to the vehicle body 18 and then, as a second step, connecting the seatback 14 to the joint 20 having been fixed to the vehicle body 18. The second step of work must be made by stretching the operator's hand or hands awkwardly into a limited space near the seat assembly because of the unseparable construction of the joint 20.

Thus, elimination of the above-mentioned brawbacks encountered in conventional seatback pivotal joints is an essential object of the present invention.

DESCRIPTION OF THE EMBODIMENTS

Figure 3A:
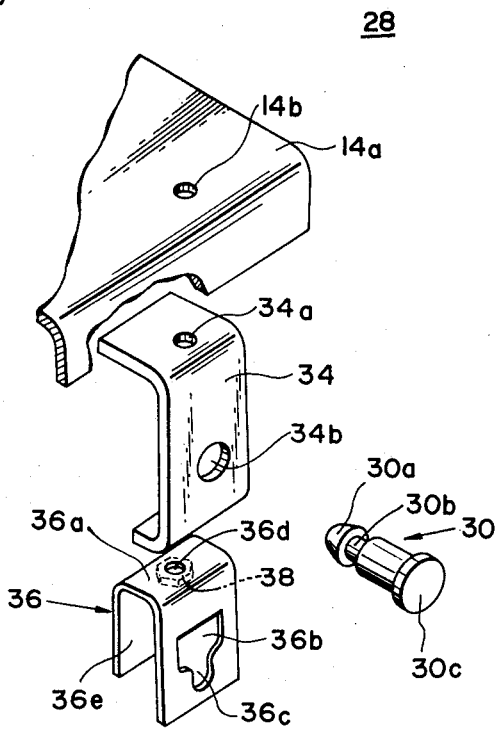
FIG. 3A is an exploded view of a seatback pivotal joint of the first embodiment according to the present invention.
Figure 3B:
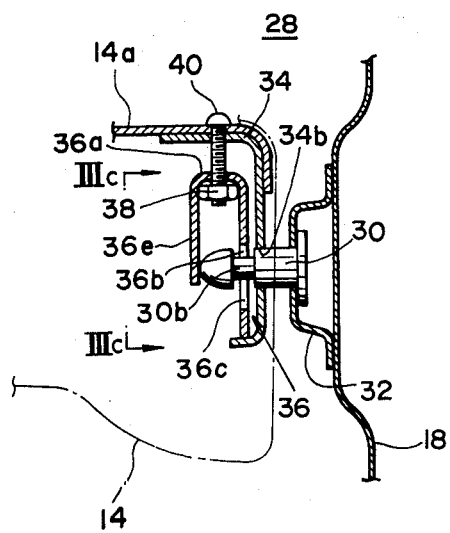
FIG. 3B is a section view of the joint of FIG. 3A in an incompletely assembled condition.

Referring to FIGS. 3A, 3B, 3C 3D and 3E, there is shown the first embodiment according to the present invention. The seatback pivotal joint 28 of this embodiment comprises a headed pin 30 welded at its lower enlarged section 30c to a bracket 32 which is mounted on the vehicle body 18 (see FIG. 3B). As is best shown in FIG. 3A, the pin 30 is formed with an annular groove 30b between a cone-shaped head 30a and the lower enlarged section 30c. A generally C-shaped bracket 34 is fixedly connected at its upper section to a frame 14a of the seatback 14 in such a manner that an opening 34a formed in the upper section of the bracket 34 and an opening 14b formed in the frame 14a are brought into alignment with each other. The bracket 34 is further formed at its generally middle section with a circular opening 34b into which the major portion of the pin 30 is to be inserted in the later-mentioned manner. A generally U-shaped catcher 36 is arranged in the bracket 34 with its base section 36a protruding upward. One of the leg sections of the catcher 36 is formed with an opening which includes a larger section 36b and a smaller section 36c. The larger section 36b is sized to freely accommodate the major portion of the pin 30, while the smaller section 36c is sized to match with the groove 30b of the pin 30. The base section 36a of the catcher 36 is formed with an opening 36d. A nut 38 is welded to the inner surface of the base section 36a of the catcher 36 in a manner to be aligned with the opening 36d. As shown in FIG. 3B, a bolt 40 passing through the opening 14b of the seatback frame 14a and the opening 34a of the bracket 34 passes through the opening 36d of the catcher 36 and is finally screwed into the nut 38. Thus, it will be appreciated that turning the bolt 40 in a given direction induces upward or downward displacement of the catcher 36 relative to the C-shaped bracket 34.

Figure 3C:
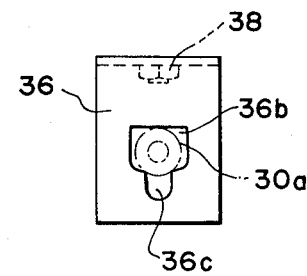
FIG. 3C is a view taken along the line IIIc—IIIc of FIG. 3B, but a part of the joint being omitted from illustration for clarification of the drawing.

When assembling the joint 28 of this first embodiment, the catcher 36 is moved, by turning the bolt 40, to a position where the larger section 36b of the opening of the catcher 36 is in alignment with the opening 34b of the bracket 34. The seatback 14 is then moved with the associated joint parts fixed thereto allowing the pin 30 fixed to the vehicle body 18 to advance through the opening 34b of the bracket 34 and the larger opening section 36b of the catcher 36 and to finally contact with the other leg portion 36e of the catcher 36, as is depicted by FIGS. 3B and 3C.

Then, the bolt 40 is turned in a given direction to move the catcher 36 upward to a position where the smaller opening section 36c of the catcher 36 catches the groove 30b of the pin 30 as is understood from FIGS. 3D and 3E. Under this condition, the pivotal connection between the pin 30 and the bracket 34 is assured by the presence of the catcher 44 which functions as a retainer. Substantially the same joint as that mentioned above is mounted on the longitudinally opposite side of the seatback 14 so that the seatback 14 is tiltable about the pins of these paired joints.

Referring to FIGS. 4A, 4B, 4C, 4D and 4E, there is shown the second embodiment of the present invention. The joint 42 of this embodiment comprises substantially the same parts as those of the first embodiment 28 except for the catcher. Thus, the following explanation is directed only to the catcher. The same parts as those of the first embodiment are designated by the same numerals.

The catcher 44 of this second embodiment is formed into a generally C-shape so that it has an upper horizontal section 44a, a vertical section 44b and a lower horizontal section 44c, as is best shown in FIG. 4A. Similar to the first embodiment, the upper horizontal section 44a has an opening 44d with which a nut 38 welded to the inner surface of the section 44a is aligned. The lower horizontal section 44c has an upwardly extending flange 44e which is formed at its generally middle section with a cutout 44f. The cutout 44f is sized to match with the groove 30b of the pin 30.

When assembling the joint 42 of this embodiment, the catcher 44 is moved, by turning the bolt 40, to a position where the clearance defined between the upper horizontal section 44a and the flange 44e faces the circular opening 34b of the bracket 34. Under this condition, the pin 30 can advance through the opening 34b and finally contact at its head 30a with the vertical section 44b of the catcher 44 upon movement of the seatback 14. This process will be understood from FIGS. 4B and 4C.

Figure 4B:
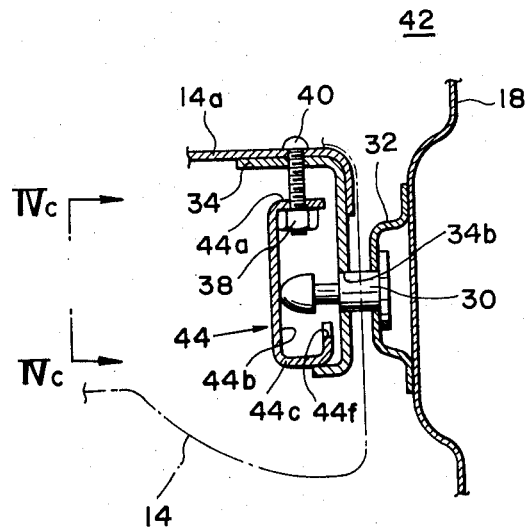
FIG. 4B is a section view of the joint of FIG. 4A in an incompletely assembled condition.
Figure 4C:
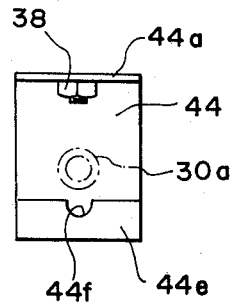
FIG. 4C is a view taken along the line IVc—IVc of FIG. 4B, but a part of the joint being omitted from illustration for clarification of the drawing.
Figure 4D:
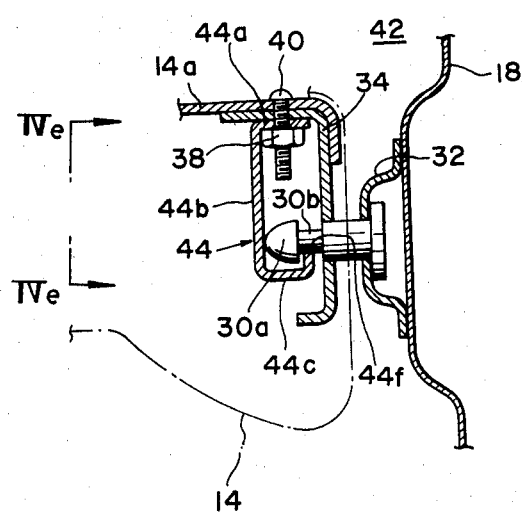
FIG. 4D is a view similar to FIG. 4B, but showing a completely assembled condition of the joint.
Figure 4E:
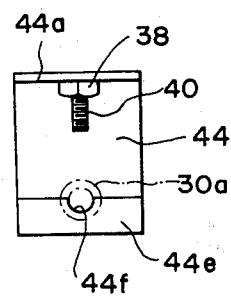
FIG. 4E is a view taken along the line IVe—IVe of FIG. 4D, but a part of the joint being omitted from illustration for clarification of the drawing.

Then, the bolt 40 is turned in a given direction to move the catcher 44 upward to a position where the cutout 44f of the catcher 44 catches the groove 30b of the pin 30, as is understood from FIGS. 4D and 4E. Under this condition, the pivotal connection between the pin 30 and the bracket 34 is assured by the presence of the catcher 44 which functions as a retainer.

Figure 5A:
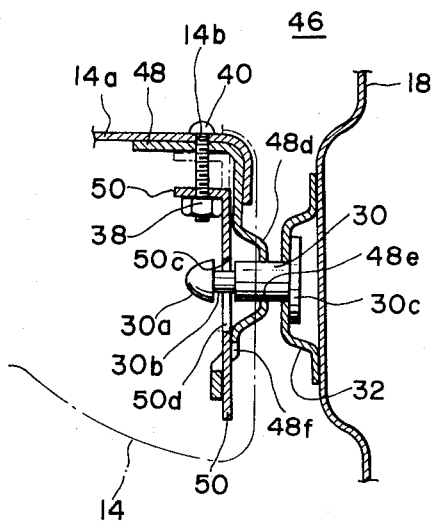
FIG. 5A is a section view of a seatback pivotal joint of the third embodiment according to the present invention.
Figure 5B:
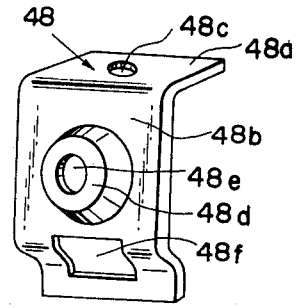
FIG. 5B is a perspective view of a bracket used in the joint of FIG. 5A.

Referring to FIGS. 5A and 5B, there is shown the third embodiment of the invention. The joint 46 of this embodiment comprises a pin 30 which is connected to the vehicle body 18 through a bracket 32 in substantially the same manner as in the case of the first (or second) embodiment. In this third embodiment, a bracket 48 as shown in FIG. 5B is employed as a substitute for the generally C-shaped bracket 34 of the first embodiment. As shown in the drawing, the bracket 48 is formed into a generally L-shape so that it has an upper horizontal section 48a and a vertical section 48b. The lower end portion of the vertical section 48b is slightly curved inwardly. The upper section 48a is formed with an opening 48c through which the bolt 40 is to be passed. The vertical section 48b of the bracket 48 is formed with a circular projection 48d extending outward. The projection 48d is formed with a circular opening 48e which is sized to smoothly receive the pin 30. The curved lower end portion of the vertical section 48b is formed with a rectangular opening 48f. As will become clear as the description proceeds, the circular projection 48d acts as the other leg portion 36e of the U-shaped catcher 36 of the first embodiment which functions to limit the insertion of the pin 30. The bracket 48 is welded at the upper horizontal section 48a to the frame 14a of the seatback 14 with the opening 48c aligned with the opening 14b of the frame 14a, and with the projection 48d protruding outwardly. A generally L-shaped catcher 50 is arranged behind the bracket 48 with its lower section passing through the rectangular opening 48f of the bracket 48. The upper horizontal section 50a of the catcher 50 is formed with an opening 50b with which a nut 38 welded to the section 50a is aligned. Although not well shown in the drawings, the major portion of the catcher 50 is formed with an opening which includes a larger section 50c and a smaller section 50d. Similar to the opening of the generally U-shaped catcher 36 of the first embodiment, the larger section 50c is sized to freely receive the major portion of the pin 30, while the smaller section 50d is sized to match with the groove 30b of the pin 30.

When assembling the joint 46, the catcher 50 is moved, by turning the bolt 40, into a position shown by solid lines where the larger section 50c is in alignment with the circular opening 48e of the bracket 48. Under this condition, the pin 30 is freely inserted into the opening 48e of the bracket 48 and finally to a position where the head 30a of the pin 30 is positioned inboard of the catcher 50, as is shown by FIG. 5A. Then, the bolt 40 is turned in a given direction to move the catcher 50 upward into a position as shown by phantom lines where the smaller section 50d of the opening of the catcher 50 catches the groove 30b of the pin 30. Thus, the pivotal connection between the pin 30 and the bracket 48 is assuredly made because of the presence of the catcher 50 which functions as the retainer.

Figure 6:
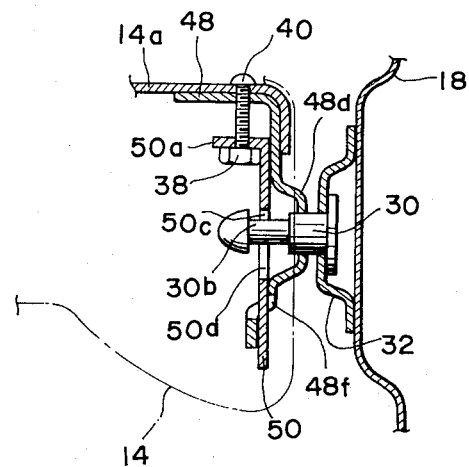
FIG. 6 is a view showing a slight modification of the joint of FIG. 5A.

If desired, the longitudinal length of the groove 30b of the pin 30 may be much enlarged as is shown by FIG. 6. With this construction, the catching of the pin 30 with the catcher 50 is much more facilitated.

From the above description, it will be appreciated that according to the present invention, the pivotal connection between the pin fixed to the vehicle body and the bracket fixed to the seatback is assuredly made because of the provision of the catcher. Furthermore, it will be appreciated that according to the present invention, unsightly parts of both the joint and the vehicle body are consealed from sight.

What is claimed is:

1. A seatback pivotal joint for permitting the seatback of a seat to be tiltable back and forth relative to the seat proper comprising:
   a pin about which said seat back pivots securely connected at one end thereof to a stationary member located beside said seat, said pin having an annular groove formed around the axis thereof;
   a bracket securely connected to said seatback, said bracket having an opening therein through which said pin passes so that said annular groove of said pin is located behind said opening with respect to said stationary member;
   a catcher movably arranged behind said bracket said catcher having retaining means engageable with said annular groove of said pin to retain said pin when said catcher takes a predetermined position, said retaining means including a cutout formed in said catcher, said cutout being sized to match with said groove of said pin whereby when said catcher takes said predetermined position, said cutout engages said groove to retain said pin; and
   moving means for moving said catcher from a position where said retaining means of said catcher is inoperative to said predetermined position, said moving means including a freely rotatable bolt held in an opening formed in said bracket, and a nut fixed to said catcher, said bolt being screwed into said nut whereby turning said bolt about the axis thereof induces the movement of said catcher.

2. A seatback pivotal joint as claimed in claim 1, further comprising stopping means for limiting the axial movement of said pin in a direction of insertion of said pin into said opening of said bracket.

3. A seatback pivotal joint for permitting the seatback of a seat to be tiltable back and forth relative to the seat proper, comprising:
   a pin securely connected at its one end to a stationary portion of a vehicle body, said pin having an annular groove formed about the axis thereof;
   a bracket having one end secured to a frame of the seatback, said bracket being formed with an opening through which said pin passes in such a manner that the annular groove of the pin is located behind said bracket with respect to said stationary portion;
   a generally U-shaped catcher having first and second leg portions which are integrally connected through a base portion, said catcher being movably arranged behind said bracket with the base portion protruding toward the end of said bracket and with the first leg portion facing the major section of said bracket, said first leg portion being formed with a cutout through which said pin passes in such a manner that the annular groove of the pin is located in the cutout, said cutout including a larger section which is sized to freely receive said pin and a smaller section which is sized to match with the annular groove of the pin;
   a nut secured to the inside surface of said base portion of said catcher at a position to be aligned with an opening formed in said base portion; and
   a bolt passing through an opening formed in said bracket and said opening of said base portion of the catcher and screwed into said nut, whereby when said bolt is turned in a given direction, said catcher is moved from a position where the larger section of said cutout of the catcher receives said pin to a position where the smaller section of said cutout tightly engages with the annular groove of the pin to catch the same.

4. A seatback pivotal joint for permitting the seatback of a seat to be tiltable back and forth relative to the seat proper, comprising:
   a pin securely connected at its one end to a stationary portion of a vehicle body, said pin having an annular groove formed about the axis thereof;
   a bracket having one end secured to a frame of the seatback, said bracket being formed with an opening through which said pin passes in such a manner that the annular groove of the pin is located behind the bracket with respect to said stationary portion;
   a generally C-shaped catcher having an upper horizontal portion and a lower horizontal portion which are integrally connected through a vertical portion, said catcher being movably arranged behind said bracket with the inside surface of said vertical portion facing the major portion of said bracket, said lower horizontal portion being formed with a flange which is formed with a cutout which is sized to match with the annular groove of said pin;
   a nut secured to the inside surface of said upper horizontal portion of said catcher at a position to be aligned with an opening formed in said upper horizontal portion; and a bolt passing through an opening formed in said bracket and said opening of said upper horizontal portion of said catcher and screwed into said nut, whereby when said bolt is turned in a given direction, said catcher is moved from a position where the cutout of said catcher is disengaged from said annular groove of the pin to a position where said cutout tightly engages with the annular groove to catch the pin.

5. A seatback pivotal joint for permitting the seatback of a seat to be tiltable back and forth relative to the seat proper, comprising:

a pin securely connected at its one end to a stationary portion of a vehicle body, said pin having an annular groove formed about the axis thereof;

a bracket having one end secured to a frame of the seatback, said bracket being formed with an annular projection which has a central opening through which said pin passes in such a manner that the annular groove of the pin is located behind the bracket with respect to said stationary portion, said bracket being formed with a rectangular opening at a position opposite to said one end thereof with respect to said annular projection;

a generally L-shaped catcher having an upper horizontal portion and a vertical portion which are integrally connected, said catcher being movably arranged behind said bracket with the lower end of said vertical portion passing through said rectangular opening of the bracket, said vertical portion of the catcher being formed with a cutout which includes a larger section which is sized to freely receive said pin and a smaller section which is sized to match with the annular groove of said pin;

a nut secured to the inside surface of said upper horizontal portion of the catcher at a position to be aligned with an opening formed in the horizontal portion; and a bolt passing through an opening formed in said bracket and said opening of the horizontal portion of the catcher and screwed into said nut, whereby when said bolt is turned in a given direction, said catcher is moved from a position where the larger section of said catcher receives said pin to a position where the smaller section of the cutout tightly engages with the annular groove of the pin to catch the same.

* * * * *

UNITED STATES PATENT AND TRADEMARK OFFICE
CERTIFICATE OF CORRECTION

PATENT NO. : 4,368,557
DATED : January 18, 1983
INVENTOR(S) : Hideho INASAWA; Yoshinori AKIYAMA It is certified that error appears in the above—identified patent and that said Letters Patent is hereby corrected as shown below:

On the Title page,

At line [73], change "Nippon" to --Nissan--.

Signed and Sealed this

Seventh Day of June 1983

[SEAL]

Attest:

DONALD J. QUIGG

Attesting Officer

Acting Commissioner of Patents and Trademarks